United States Patent [19]
Tickell, Jr. et al.

[11] Patent Number: 5,500,597
[45] Date of Patent: Mar. 19, 1996

[54] MULTIPLE TRANSMIT FREQUENCY INDUCTION LOGGING SYSTEM WITH CLOSED LOOP CONVERSION CIRCUITRY FOR PHASE AND GAIN VARIATION ELIMINATION

[75] Inventors: Edward B. Tickell, Jr., Crowley; Peter J. Schoch, Fort Worth; Lonnie M. Moseley, Arlington; Dwight A. Bloomfield, Benbrook, all of Tex.

[73] Assignee: Computalog Research, Inc., Fort Worth, Tex.

[21] Appl. No.: 99,621

[22] Filed: Jul. 30, 1993

[51] Int. Cl.⁶ .................................. G01V 3/18; G01V 3/10
[52] U.S. Cl. ......................... 324/339; 324/232; 324/233
[58] Field of Search .................................. 324/338–343, 324/232, 233, 225; 364/422

[56] References Cited

U.S. PATENT DOCUMENTS

| | | | |
|---|---|---|---|
| 4,207,520 | 6/1980 | Flora et al. | 324/233 |
| 4,499,421 | 2/1985 | Sinclair | 324/339 |

Primary Examiner—Walter E. Snow
Attorney, Agent, or Firm—Andrew J. Dillon

[57] ABSTRACT

An induction logging tool is disclosed for utilization in conjunction with surface electronic equipment for measuring a characteristic of subsurface formations. A transmit signal which is comprised of a repetitive sequential series of at least three transmit frequencies is generated by coupling an oscillator to a transmitter coil and a plurality of selectable tuning capacitors. A signal characteristic of the response of the formation to this transmit signal is detected at a receiver coil array and two phase sensitive detectors are then utilized to generate output signals indicative of the magnitude of the X and R components of the formation signal which is in phase with a reference phase signal. The output signal of each phase sensitive detector is then utilized to accurately determine the X and R component of the receiver coil signal for each frequency by nulling the output of the phase sensitive detector utilizing a closed loop conversion circuit which eliminates errors due to phase and gain variations. The output signal is then compensated by convolving the output of the phase sensitive detector with one of multiple filter coefficient sets which are each associated with a particular transmit frequency, for each portion of the output signal which is attributable to a particular transmit frequency. Each filter coefficient set preferably comprises a Finite Impulse Response (FIR) filter, which is derived by altering each filter coefficient to induce a specified response of the induction tool to a simulated step function.

11 Claims, 2 Drawing Sheets

MULTIPLE TRANSMIT FREQUENCY INDUCTION LOGGING SYSTEM WITH CLOSED LOOP CONVERSION CIRCUITRY FOR PHASE AND GAIN VARIATION ELIMINATION

BACKGROUND OF THE INVENTION

1. Field of the Invention:

The present invention relates in general to electrical induction logging systems for determining the characteristics of subsurface formations and in particular to an electrical induction logging system which utilizes multiple frequencies to measure the conductivity of subsurface formations. Still more particularly, the present invention relates to a multiple frequency electrical induction logging system which utilizes a closed loop conversion circuit to eliminate errors resulting from gain or phase variations.

2. Description of the Prior Art:

The nature and characteristics of various subsurface formations penetrated by a borehole are important considerations in the oil and gas industry during the drilling of that borehole. The existence, depth, location, quantity and other parameters concerning the oil and gas trapped within formations must be determined. Various techniques have been employed in the past to determine this information regarding formations penetrated by a borehole. One technique commonly utilized is induction logging. Induction logging measures the resistivity (or conductivity) of a formation by first inducing eddy currents to flow within these formations in response to an alternating current transmitter signal and then measuring a phase component signal in a received signal which is generated by the presence of those eddy currents. Variations in the magnitude of the eddy currents in response to variations in formation conductivity are then reflected as variations in the receiver signal. Thus, in general, the magnitude of a phase component of the receiver Signal, that component in-phase with the transmitter signal, is indicative of the conductivity of a formation.

In theory, the electrical resistivity of a formation should be relatively high when that formation contains a high percentage of hydrocarbons due to the fact that hydrocarbons are a poor conductor of electricity. Where hydrocarbons are not present in the formations and the formations contain salt water, the electrical resistivity of a formation should be relatively low. Formation water, which is typically highly saline, is a relatively good conductor of electricity. Induction resistivity logging tools thus obtain information regarding the formations which may be interpreted to indicate the presence or absence of hydrocarbons.

U.S. Pat. Nos. 3,340,464, 3,147,429, 3,179,879, and 3,056,917 are illustrative of typical prior art well logging tools which utilize the basic principles of induction logging. In each of the tools disclosed within these patents, a signal generator operates to produce an alternating current transmitter signal which is applied to a transmitter coil. The current in the transmitter coil induces a magnetic field in the surrounding formations. This magnetic field, in turn, causes eddy currents to flow within the formations. Because of the presence of these formation currents, a magnetic field is coupled into a receiver coil, thereby generating a receiver signal. Those skilled in the art will appreciate that such logging tools typically include a receiver coil and a transmitter coil which may each be comprised of multiple coils arranged in a predetermined fashion to obtain a desired response. The receiver signal is typically then amplified and applied to one or more Phase Sensitive Detectors (PSD). Each Phase Sensitive Detector then detects a phase component signal having the same phase as a phase reference signal which is also applied to the detector. The phase reference signal has a predetermined phase relationship to the current in the transmitter coil and the output of the phase sensitive detector may be further processed downhole or may be sent to the surface for processing by surface equipment.

A quantative determination of the conductivity of formations surrounding a borehole is based in large part on the value obtained for the phase component that is in phase with the transmitter current in the transmitter coil. This component signal is typically referred to as the real or "R" phase component. Measurement of a phase component signal which has a phase orthogonal to the transmitter current is sometimes obtained. This component signal is generally referred to as the "X" phase component signal.

Measurement of both the R and X phase component signals of the receiver signal is well known. U.S. Pat. Nos. 3,147,429 and 3,179,879 both disclose induction logging tools which detect phase quadrature components of the receiver signal from the receiver coil. The tools disclosed in these patents show the output from a receiver amplifier being applied to identical phase sensitive detector circuits, one for detecting the R component signal and the other for detecting the X component signal. Appropriate phase shifting components are provided for generating the phase quadrature phase reference signals required for the phase sensitive detectors, in order to resolve the phase component signals.

Numerous patents have been issued which disclose techniques for eliminating phase shift errors which may be present in induction logging tools. These errors generally arise as static phase shift errors and dynamic or temperature dependent phase shift errors. Static phase shift errors are those phase shifts which occur when the tool is operated at a steady temperature condition. These phase shift errors are introduced into the detected phase component by certain electrical components within the tool. Dynamic phase shift errors occur as a result of the influences of temperature drift on the detection circuits.

U.S. Pat. No. 3,340,464 discloses a circuit for automatically adjusting the varying phase shifts which occur as a result of temperature drift by deriving a test signal from the current in the transmitter coil and thereafter substituting this test signal for the normal receiver coil output signal, generating a quadrature reference signal to the phase sensitive detector to detect a phase component within the receiver signal, and, phase shifting the reference signal as a function of the magnitude of the detected phase component signal in a direction to minimize that signal. This phase error compensation circuit does not attempt to segregate the relatively fixed or constant phase errors which arise within a tool from temperature dependent phase errors which vary with time during logging and resulting from component drift within the circuits. That is, this technique attempts to compensate for any and all phase shifts, regardless of the source of those phase shifts, which have occurred since the last phase compensation.

Another known phenomena in induction logging is the difference in the formation response as a function of frequency and formation conductivity. In general, the response signal received by an induction tool at low conductivities increases as the square of the frequency for a constant transmitter current. Because of the greater formation response at higher frequencies than at lower frequencies over most of the conductivities encountered, it becomes apparent that a low distortion transmitter signal is required. The more distorted a transmitter signal is the larger in amplitude are the harmonics of the fundamental frequency. Such harmonics propagate through the formation from the transmitter to the receiver with an attenuation and phase shift which are not related to those of the fundamental frequency. Thus, these effects may introduce false signals into the receiver that may cause a misleading result to be obtained from the induction tool measurement.

The variation in formation response with frequency may also be utilized beneficially to extend the range of formation resistivity that may be accurately measured by an induction logging tool. At high formation conductivities and higher frequencies a phenomena known as "skin effect" causes a loss of proportionality between the receive signal and the formation conductivity, introducing additional complexity in the interpretation of the signals.

Additionally, at lower transmitter frequencies and low conductivities, the response from the formation falls below the noise level of the induction logging system. In such cases, meaningful measurements are impossible. Thus, when encountering low conductivities, a high frequency for the transmitter signal would provide a more accurate reading of the formation conductivity. However, because of the sloping away of the response curves for the higher frequencies at higher conductivities, it would be desirable to have a lower transmitter frequency at high conductivities to avoid ambiguity in the conductivity derived from these measurements. This may be achieved by selection of a single frequency appropriate to the conductivity range expected prior to logging or by the generation of two or more frequencies simultaneously in the transmitter, with subsequent frequency separation in each receiver circuit and in each phase selective detection circuit or by sequentially switching to different frequencies while logging.

U.S. Pat. No. 4,449,421 discloses a digital induction logging system which includes means for generating a plurality of transmitter frequencies. In this manner, selection of the transmitter frequency may be based on optimizing the measurement of a characteristic of the formations being encountered by the tool. Automatic phase compensation is disclosed within U.S. Pat. No. 4,499,421, and is utilized to dynamically compensate for both static and dynamic temperature dependent phase errors due to circuits of the tool involved in the component measurements. A floating point analog-to-digital converter capable of responding to the wide dynamic range in the detected phase component signals is also provided within U.S. Pat. No. 4,499,421, in order to convert the phase detector output into digital signals for use by a processor.

While the aforementioned system provides an induction tool which permits the frequency of the transmitter signal to be selectable from among a plurality of transmitter signals those skilled in the art will appreciate that it would be advantageous to provide an induction logging system which is capable of simultaneously transmitting multiple frequencies during logging operations. Further, it would clearly be advantageous to provide a conversion circuit which is relatively insensitive to gain or phase variations within the amplifier or phase sensitive detector.

SUMMARY OF THE INVENTION

It is therefore one object of the present invention to provide an improved electrical induction logging system for detecting the characteristics of subsurface formations.

It is another object of the present invention to provide an improved electrical induction logging system which utilizes multiple frequencies to measure the conductivity of subsurface formations.

It is yet another object of the present invention to provide an improved multiple frequency electrical induction logging system which utilizes a closed loop conversion circuit to eliminate errors resulting from gain or phase variations.

The foregoing objects are achieved as is now described. An induction logging tool is disclosed for utilization in conjunction with surface electronic equipment for measuring a characteristic of subsurface formations. A transmit signal which is comprised of a repetitive sequential series of at least three transmit frequencies is generated by coupling an oscillator to a transmitter coil and a plurality of selectable tuning capacitors. A signal characteristic of the response of the formation to this transmit signal is detected at a receiver coil array and two phase sensitive detectors are then utilized to generate output signals indicative of the magnitude of the X and R components of the formation signal which is in phase with a reference phase signal. The output signal of each phase sensitive detector is then utilized to accurately determine the X and R component of the receiver coil signal for each frequency by nulling the output of the phase sensitive detector utilizing a closed loop conversion circuit which eliminates errors due to phase and gain variations. The output signal is then compensated by convolving the output of the phase sensitive detector with one of multiple filter coefficient sets which are each associated with a particular transmit frequency, for each portion of the output signal which is attributable to a particular transmit frequency. Each filter coefficient set preferably comprises a Finite Impulse Response (FIR) filter, which is derived by altering each filter coefficient to induce a specified response of the induction tool to a simulated step function.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figures 1, 3:
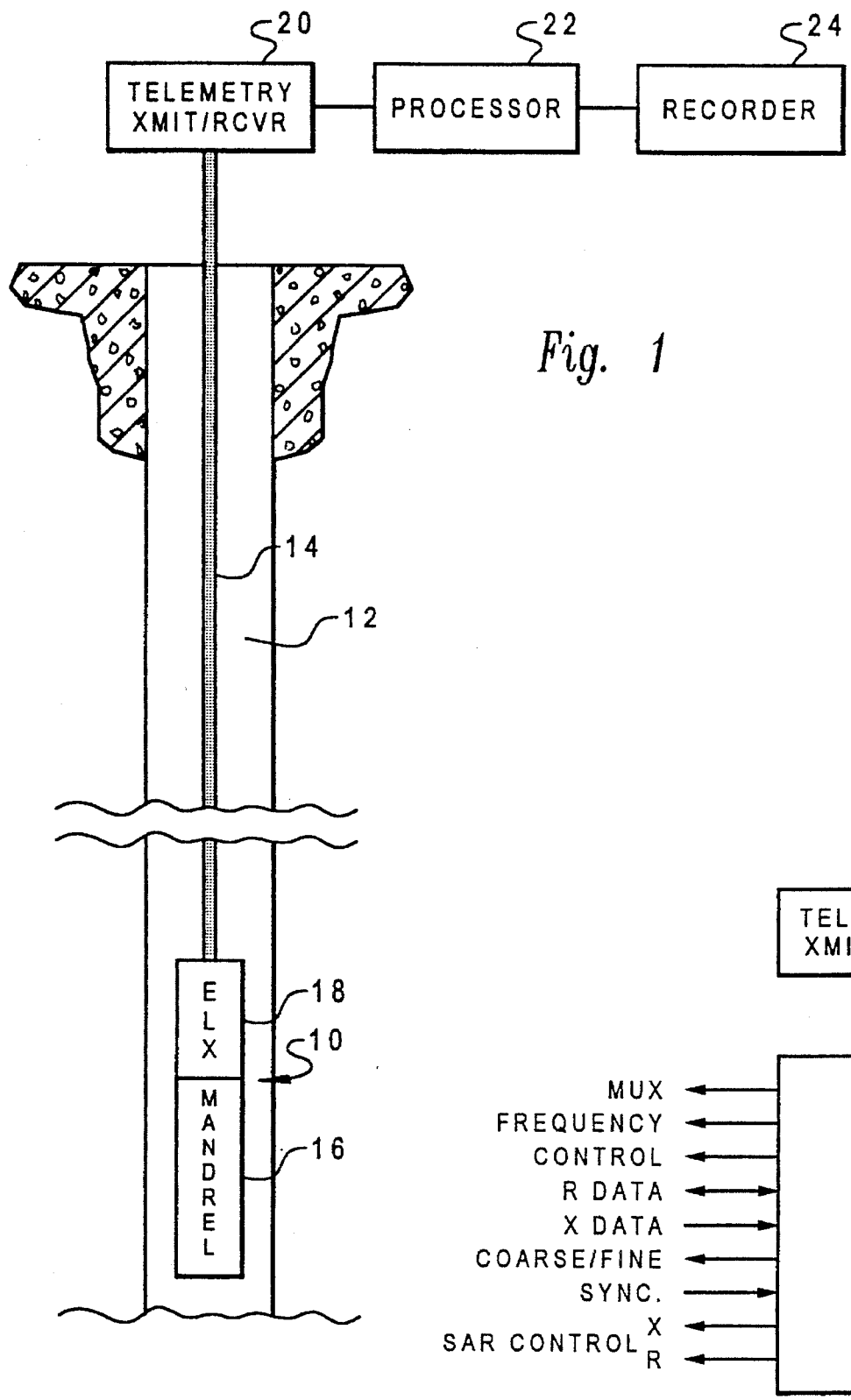
FIG. 1 is a pictorial illustration of a multiple frequency induction logging system for logging a borehole in accordance with the present invention.
FIG. 3 is a high level block diagram of a telemetry and control circuit utilized in the multiple frequency induction logging system of the present invention.

With reference now to the figures and in particular with reference to FIG. 1, there is depicted a pictorial illustration of a multiple frequency induction logging system for logging a borehole in accordance with the present invention. As illustrated, an induction logging tool 10 is suspended within a borehole 12 by means of a wireline 14. Induction logging tool 10 preferably includes a mandrel section 16 and an electronics cartridge 18, greater details of which will be provided herein. As those skilled in the art will appreciate, induction logging tool 10 preferably includes a plurality of transmit and receive coils which are preferably disposed about mandrel 16 in a manner similar to that disclosed in U.S. Pat. No. 3,329,889.

As is typical in such induction logging systems, induction logging tool 10 is coupled to selected surface electronics via wireline 14 and telemetry transmitter/receiver 20. A processor 22 and recorder 24 are also preferably provided for manipulation of signals generated utilizing induction logging tool 10 and the recording thereof.

Figure 2:
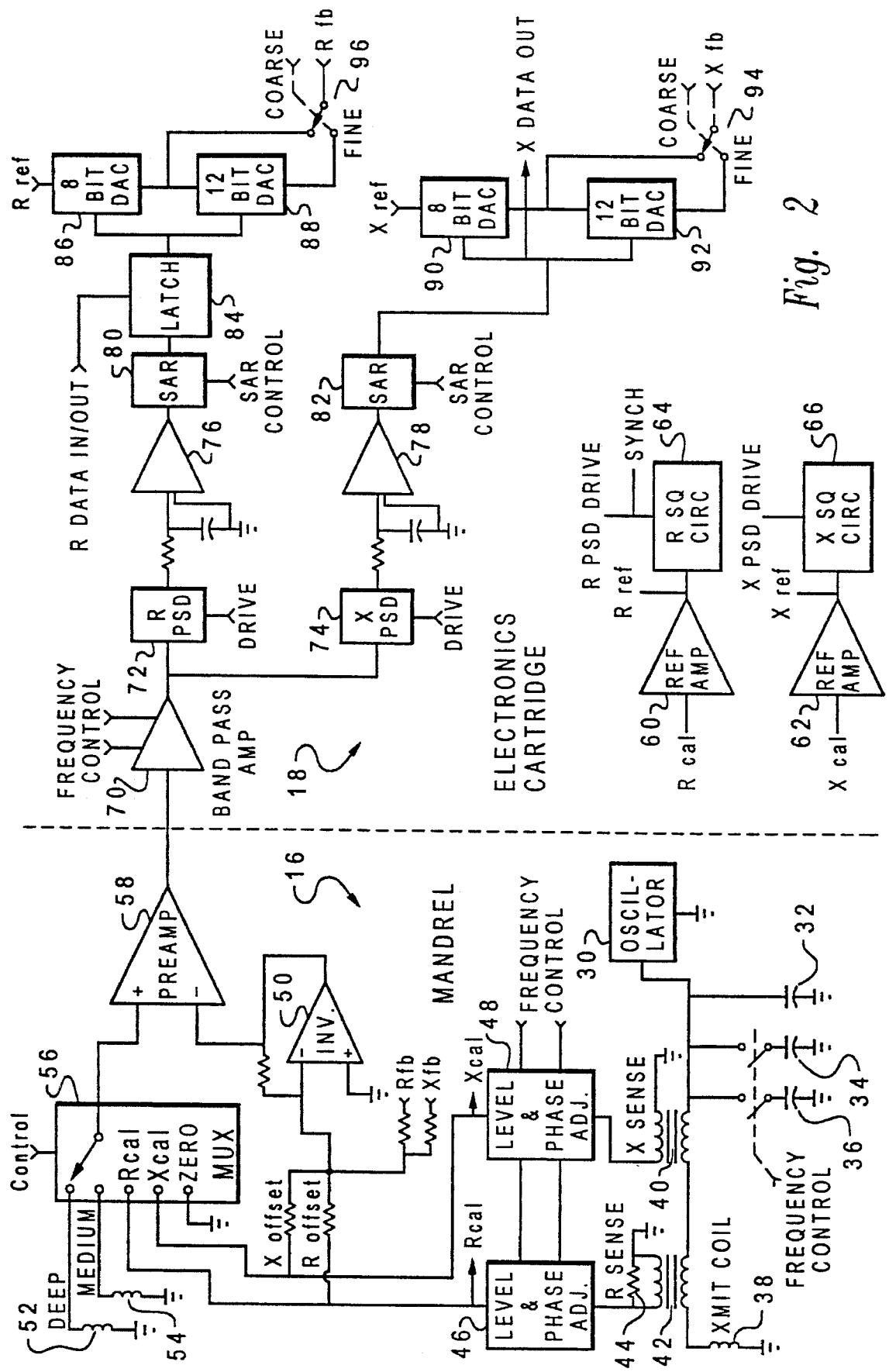
FIG. 2 is a high level schematic diagram of the multiple frequency induction logging system of the present invention.

Referring now to FIG. 2, there is depicted a high level schematic diagram of the multiple frequency induction logging system of the present invention. As illustrated, the multiple frequency induction logging system includes an oscillator 30 which is preferably a constant voltage oscillator wherein the output frequency may be controlled by the inductance of transmit coil 38 in parallel with multiple tuning capacitors. As illustrated, tuning capacitors 32, 34 and 36 are provided and by the selective coupling of these tuning capacitors in parallel with transmit coil 38, a highly stable transmitter with low distortion levels may be provided which is capable of transmitting multiple frequencies in a sequential series in a manner known to those having skill in the art as time multiplexing. In the depicted embodiment of the present invention, the selected operating frequencies are 10, 20, and 40 kilohertz.

Transmit current is preferably sampled, in the depicted embodiment in the present invention, utilizing two sense transformers. The R sense transformer 42 is preferably terminated with a low value resistor 44, producing an output which is in phase with the transmitter current. X sense transformer 40 is not terminated, as illustrated, thus producing an output which is in quadrature with the transmitter current.

As depicted within FIG. 2, the outputs of each sense transformer are coupled to level and phase adjust circuits 46 and 48. Level and phase adjust circuits 46 and 49 preferably produce R and X calibration signals which are standardized for a particular receiver coil array, at each operating frequency. As will be explained in greater detail herein, these calibration signals are also preferably utilized to provide reference voltages for digital to analog conversion Circuits and phase sensitive detector drive signals.

As illustrated, these calibration signals are also applied to inverter 50 and utilized in conjunction with the output of multiplexer 56 to provide a small amount of offset which permits the multiple frequency induction logging system to measure signals below zero.

As illustrated, multiplexer 56 periodically samples the output of deep receiver coil 52 and medium receiver coil 54, along with the R calibration signal, the X calibration signal and a zero value. These sampled outputs are coupled to preamplifier 58 and the output of preamplifier 58 is then applied to controllable bandpass amplifier 70 within electronics cartridge 18. Controllable bandpass amplifier 70 is preferably controllable about a center frequency which is selected by the controller based upon the transmit frequency in utilization. The gain of bandpass amplifier 70 is also preferably controlled inversely with frequency to produce a constant sensitivity at phase sensitive detectors 72 and 74. In a manner well known to those having ordinary skill in the art, the X and R outputs of controllable bandpass amplifier 70 are then coupled to phase sensitive detectors 72 and 74. In the depicted embodiment of the present invention the total gain of the amplification is sufficiently high to resolve the least significant bit at the analog to digital converter. Assuming sufficient gain, a closed loop conversion circuit is then relatively insensitive to gain, phase or linearity variations of the amplifiers and phase sensitive detectors and gain or phase variations of the driver circuits.

To begin each conversion cycle the previous R value of that sample is loaded into latch 84. This will result in the R digital-to-analog converter 86 and 88 generating an R (Rfb) feedback voltage which nulls most of the R signal at phase sensitive detector 72. With X feedback switch 94 in the coarse position, X successive approximation register 82 is started. Each bit is then either kept or rejected dependent upon the output of comparator 78. After the eighth bit, the phase sensitive detector output is nulled with the resolution of coarse digital-to-analog converter and the feedback is then switched to the fine position. The coarse digital-to-analog converter output is then reconverted with twelve bits of resolution.

This X feedback value is then held while the process is repeated in the R channel. At the end of each conversion cycle, the outputs of both phase sensitive detectors outputs are nulled. Utilizing a successive approximation register approach the quadrature component must be reduced to a reasonable level if there is phase shift in the amplifiers or phase sensitive detectors, otherwise the large quadrature component will cause the successive approximation register to reject a needed bit or add an unneeded bit. Thereafter, the data is transmitted via a telemetry system to the surface for further processing.

Still referring to FIG. 2, the R calibration and X calibration signals are also applied to reference amplifiers 60 and 62 in order to generate reference signals. A synchronization signal and a drive signal for the phase sensitive detectors is then generated by an associated square wave generator 64 or 66.

With reference now to FIG. 3, there is depicted a high level block diagram of a telemetry and control circuit which may be utilized in the multiple frequency induction logging system of the present invention. As illustrated, a telemetry transmitter/receiver 20 is preferably coupled to a controller 98 which, in the depicted-embodiment of the present invention, is utilized to couple various control signals to induction logging tool 10 for utilization in the manner described above. As illustrated in FIG. 3, a multiplex control signal, frequency control signal, control signal, course/fine control signal and the successive approximation register signals are transmitted. Additionally, R data and X data and the synchronization signal may be received from the induction logging tool and transmitted to the surface via telemetry transmitter/receiver 20.

In a preferred embodiment of the present invention, the output signal of the phase sensitive detectors is then compensated within processor 22 (see FIG. 1) by convolving the output of each phase sensitive detector with one of multiple filter coefficient sets which are each associated with a particular transmit frequency, for each portion of the output signal which is attributable to a particular transmit frequency. Each filter coefficient set preferably comprises a Finite Impulse Response (FIR) filter, which is derived by altering each filter coefficient to induce a specified response of the induction tool to a simulated step function. A Finite Impulse Response (FIR) filter generates an output by weighting each of several inputs by constants and then adding the weighted inputs. The input values represent logging sampled data from the induction tool and the output of the filter is referred to as enhanced data. The set of weighting constants (coefficients) constitute and determine the filter. To derive a set of coefficients for a filter a computer simulation of the induction tool's response to an ideal resistivity contrast step profile was implemented. The step was then narrowed and the coefficients modified until a matched three frequency overlay was observed from an empirically derived data set.

The Finite Impulse Response filter is characterized by the following equation:

$$Y(k) = C(n)*X(k-n) + C(n-1)*X(k-n+1) + \ldots + C(0)*X(k) + \ldots + C(-n+1)*X(k+n-1) + C(-n)*X(k+n)$$

wherein Y(K) represents the present output value based on the 2n input values above and below the kth sample point of the data set. Each of the 2n+1 input values is then multiplied by the corresponding coefficient value, C(i). The k, n, and i are integer indices for the corresponding data sets. The C(O) coefficient is then multiplied by the centroid, X(k), input value. The present value, Y(k), then is the summation of the previous 2n+1 products. The Finite Impulse Response filter length is designated by the number of coefficients utilized for weighting. If each coefficient is different then the input values do not contribute equally to the output. Each data input contribution is affected by the proportionate magnitude of its associated coefficient. A large coefficient allows the associated datapoint to significantly impact the output while a small coefficient only slightly modifies the output. To help facilitate the expression for the Finite Impulse Response filter, the following sigma notation is useful:

$$Y(k) = \sum_{i=-n}^{n} C(i)*X(k-i)$$

where i is an index into the filter coefficient array, k-i is an index into the data input value array, and k is the index at the centroid value realized from the filter application. The input data values X(k-n) ... X(k+n), are then multiplied by the weighting coefficients C(-n) through C(n) respectively, and their products are then summed to produce an output, Y(k).

The subsequent output from the filter, Y(k+1) is realized in the same manner; however, the data are shifted one position left before the products are taken. This means that C(O) is now multiplied with X(k+1), not X(k), and the nth coefficient multiples X(k+1-n) to produce the Y(k+1) output value. The output value from the nonrecursive digital filter described above is the convolution of the input data and the filter's impulse response. That is, the C(n) coefficients are replaced with H(n) values which correspond to an application of an impulse signal which has replaced the X(k) data set. The resulting implication is that each C(n) is replaced by a H(n). Since the coefficients of a nonrecursive digital filter are identically defined by the filter's response to an impulse, and the number of coefficients is limited to 2n+1, the filter may be referred to as a Finite Impulse Response (FIR) filter.

To establish a viable set of filter coefficients to enhance the output of the described induction tool, a number of computer simulations were constructed. Contrast resistivity profiles greater than 1 to 1,000 were utilized for bed thickness response. From these idealized device response data, specific filter designs were tested. The performance of the convolved output was judged as the filter's ability to restore the simulated device data to the ideal step resistivity profile. Each frequency response was done as a separate filter and compared to field data responses. Additional modifications to the filter coefficients were implemented as field data became available and indicated the necessity to make adjustments to reflect consistency in the multiple frequency data set.

Since multiple frequency responses were available from the device, vertical definition of the formation has been greatly enhanced. A distinct Finite Impulse Response (FIR) filter can then be applied to each of the multiple frequencies to produce identical vertical responses for relatively thin beds and non-invaded formations. These enhanced vertical responses gave better bed definition by compensating for adverse side bed effects. Additional information concerning radial profile was obtained by observing the relative departure of the enhanced multiple frequency induction tool outputs. The enhanced outputs of the induction tool depart from one another as a function of radial invasion. Simultaneous depth sampling of multiple frequencies produces correlation of multiple frequency data to be applied to vertical bed definition and radial invasion profile analysis that is not sequential and/or time delayed.

While the invention has been shown in only one of its forms, it is not thus limited but is susceptible to various changes and modifications without departing from the spirit thereof.

What is claimed is:

1. An induction logging tool for operation in a borehole in association with surface electronic equipment for measuring a characteristic of subsurface formations, said logging tool including a transmitter coil which induces formation currents to flow in response to a transmitter signal and a receiver coil which generates a signal characteristic of the formation in response to those currents, said logging tool comprising:

an oscillator for generating a excitation signal;

a variable resonant tuning circuit coupling said oscillator to said transmitter coil, said variable resonant tuning circuit repetitively and sequentially altering said excitation signal to one of at least three transmitter frequencies in response to a command signal;

a drive circuit for generating a reference phase signal in response to each of said at least three transmitter frequencies;

a phase sensitive detector coupled to said receiver coil and responsive to said signal characteristic of said formation and said reference phase signal for generating an output signal indicative of the magnitude of a component of said signal characteristic of said formation that is in phase with said reference phase signal; and a closed loop conversion circuit coupled to said phase sensitive detector for accurately determining said output signal of said receiver coil, said closed loop conversion circuit comprising a variable feedback generation circuit and control means for selectively altering said variable feedback to achieve a null output of said phase sensitive detector for each of said three transmitter frequencies.

2. The induction logging tool according to claim 1, wherein said output signal generated by said phase sensitive detector is a digital signal and wherein said variable feedback generator circuit includes a digital-to-analog converter.

3. The induction logging tool according to claim 2, wherein said digital-to-analog converter includes a coarse section and fine section and means for selectively switching between said coarse section and said fine section.

4. The induction logging tool according to claim 1, further including compensation means for enhancing said output signal of said phase sensitive detector, said compensation means comprising a filter coefficient set for each of said at least three transmitter frequencies and means for convolving each portion of said output signal which is resultant from a selected one of said three transmitter frequencies with an associated filter coefficient set.

5. The induction logging tool according to claim 4, wherein each filter coefficient set comprises a Finite Impulse Response (FIR) filter.

6. The induction logging tool according to claim 5, wherein each filter coefficient set is derived by altering each filter coefficient to induce a specified response of said induction logging tool to a simulated step function.

7. The induction logging tool according to claim 1, wherein said variable resonant tuning circuit comprises a plurality of selectable tuning capacitors coupled to said transmitter coil.

8. The induction logging tool according to claim 1, wherein said at least three transmitter frequencies comprise ten, twenty and forty kilohertz.

9. The induction logging tool according to claim 1, wherein said oscillator comprises a constant voltage oscillator.

10. The induction logging tool according to claim 1, further including a preamplifier disposed between said receiver coil and said phase sensitive detector.

11. The induction logging tool according to claim 10, further including a controllable bandpass amplifier disposed between said preamplifier and said phase sensitive detector and means responsive to said command signal for altering a center frequency thereof in response to a selection of one of said at least three transmitter frequencies.

* * * * *